United States Patent
Li

(10) Patent No.: US 10,381,857 B2
(45) Date of Patent: Aug. 13, 2019

(54) ALIGNMENT COILS OF WIRELESS CHARGING FOR ELECTRONIC DEVICE

(71) Applicant: Lenovo (Beijing) Limited, Beijing (CN)

(72) Inventor: Xianxi Li, Beijing (CN)

(73) Assignee: Lenovo (Beijing) Limited, Beijing (CN)

(*) Notice: Subject to any disclaimer, the term of this patent is extended or adjusted under 35 U.S.C. 154(b) by 102 days.

(21) Appl. No.: 15/084,218

(22) Filed: Mar. 29, 2016

(65) Prior Publication Data

US 2017/0163071 A1 Jun. 8, 2017

(30) Foreign Application Priority Data

Dec. 4, 2015 (CN) .......................... 2015 1 0883399

(51) Int. Cl.
  *H02J 7/00* (2006.01)
  *H02J 7/02* (2016.01)
  *G01B 7/00* (2006.01)

(52) U.S. Cl.
  CPC .............. *H02J 7/025* (2013.01); *G01B 7/003* (2013.01)

(58) Field of Classification Search
  CPC .. H02J 7/025; H02J 5/005; H02J 17/00; H02J 50/40; H02J 7/0004; H02J 50/10; B60L 11/182; B60L 11/1829; B60L 11/1831; H01F 38/14; H01Q 1/1257; G01V 3/10
  USPC ....................................................... 320/108
  See application file for complete search history.

(56) References Cited

U.S. PATENT DOCUMENTS

| | | | |
|---|---|---|---|
| 9,631,950 B2* | 4/2017 | Raedy .................. | B60L 11/182 |
| 9,739,641 B2* | 8/2017 | Raedy .................... | G01D 5/20 |
| 2012/0235636 A1* | 9/2012 | Partovi .................. | H02J 7/025 |
| | | | 320/108 |
| 2013/0024059 A1* | 1/2013 | Miller ..................... | H02J 50/12 |
| | | | 701/22 |
| 2013/0043734 A1 | 2/2013 | Stone et al. | |

(Continued)

FOREIGN PATENT DOCUMENTS

| | | |
|---|---|---|
| CN | 203366972 U | 12/2013 |
| CN | 104242962 A | 12/2014 |
| CN | 104461311 A | 3/2015 |

OTHER PUBLICATIONS

Xiuwen, Liu, "The reception of wireless broadcast television", Cable TV, No. 6, Published Jun. 20, 1996, 9 pages.

*Primary Examiner* — Nghia M Doan
(74) *Attorney, Agent, or Firm* — Ference & Associates LLC

(57) ABSTRACT

One embodiment provides an electronic device including: a processor; a power supply module coupled to the processor; a receiving antenna coupled to the power supply module, wherein receiving antenna cooperates with a transmitting antenna of a wireless charger to charge the power supply module wirelessly; an inductor arranged with respect to the receiving antenna, wherein the inductor comprises a first wire and a second wire through which a first induced voltage and a second induced voltage are generated respectively; a comparator for comparing the first and second induced voltages; and wherein the processor determines if the receiving antenna is aligned with respect to the transmitting antenna of the wireless charger based upon the comparison of the first and second induced voltages. Other aspects are described and claimed.

20 Claims, 8 Drawing Sheets

(56) References Cited

U.S. PATENT DOCUMENTS

2016/0059723 A1* 3/2016 Kim .................... B60L 11/1831
320/108
2017/0126070 A1* 5/2017 Lee ........................ H02J 50/80

* cited by examiner

ALIGNMENT COILS OF WIRELESS CHARGING FOR ELECTRONIC DEVICE

CLAIM FOR PRIORITY

This application claims priority to Chinese Application No. 201510883399.7, filed on Dec. 4, 2015, which is fully incorporated by reference herein.

FIELD

The subject matter described herein relates to the field of electronic technologies, more specifically, it relates to an electronic device and an alignment detection apparatus.

BACKGROUND

As the wireless charging function is increasingly popularized, it has become more and more important to improve the efficiency of wireless charging. When an electronic device is being charged, whether a charger end (that is, a transmitting end) and an electronic device end (that is, a receiving end) are properly aligned directly affects the charging efficiency of the electronic device. That is, if the transmitting end and the receiving end are not properly aligned, the charging efficiency would decrease significantly. Therefore, improving the effect of alignment between the transmitting end and the receiving end is a necessary means to improve the charging efficiency of electronic devices.

Normally an electromagnet is added to each of the receiving end and the transmitting end, and the effect of alignment between the transmitting end and the receiving end is improved by virtue of the attraction between the two electromagnets. However, this method is not practical for light and thin electronic devices.

BRIEF SUMMARY

In summary, an aspect provides an electronic device, comprising a processor; a power supply module operatively coupled to the processor; a receiving antenna operatively coupled to the power supply module, wherein the receiving antenna cooperates with a transmitting antenna of a wireless charger to charge the power supply module wirelessly; an inductor arranged with respect to the receiving antenna, wherein the inductor comprises a first wire and a second wire through which a first induced voltage and a second induced voltage are generated respectively; a comparator for comparing the first and second induced voltages; and a memory operatively coupled to the processor and that stores instructions executable by the processor to determine if the receiving antenna is aligned with respect to the transmitting antenna of the wireless charger based upon the comparison of the first and second induced voltages.

The foregoing is a summary and thus may contain simplifications, generalizations, and omissions of details; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

It will be seen that, in the electronic device and the alignment detection apparatus provided by the embodiments, a circuit structure is used to adjust the effect of alignment between the receiving antenna and the transmitting antenna to ensure that the receiving antenna and the transmitting antenna are aligned on the first dimension, so as to improve the charging efficiency of the electronic device. Moreover, in the electronic device provided by the embodiments, the induction circuit comprises two wires, which are small in size and light in weight, thereby adapting to the lightening and thinning of electronic devices, and improving the practical usability of the electronic devices.

Figure 1:
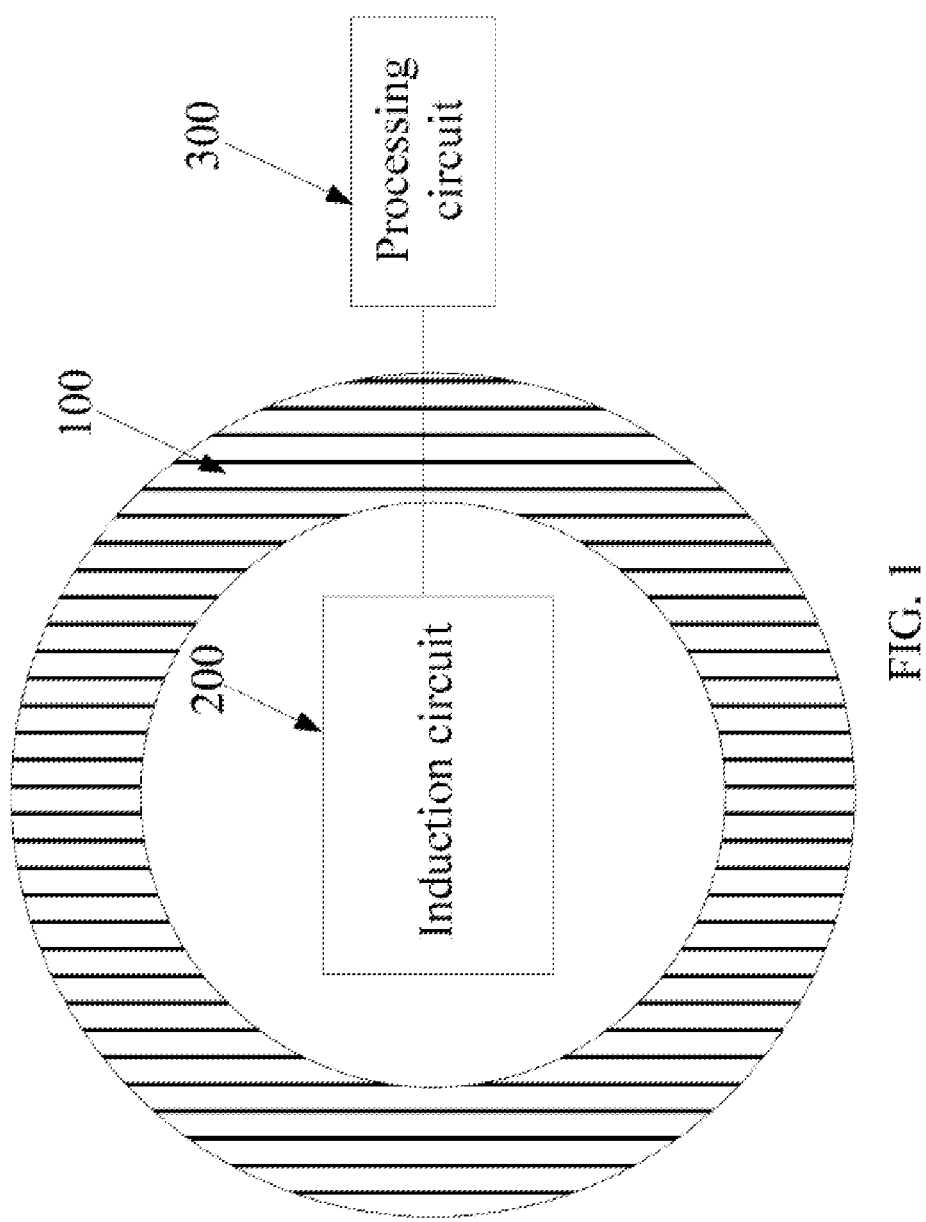
FIG. 1 is a schematic structural diagram of an electronic device in accordance with an embodiment.
Figure 2:
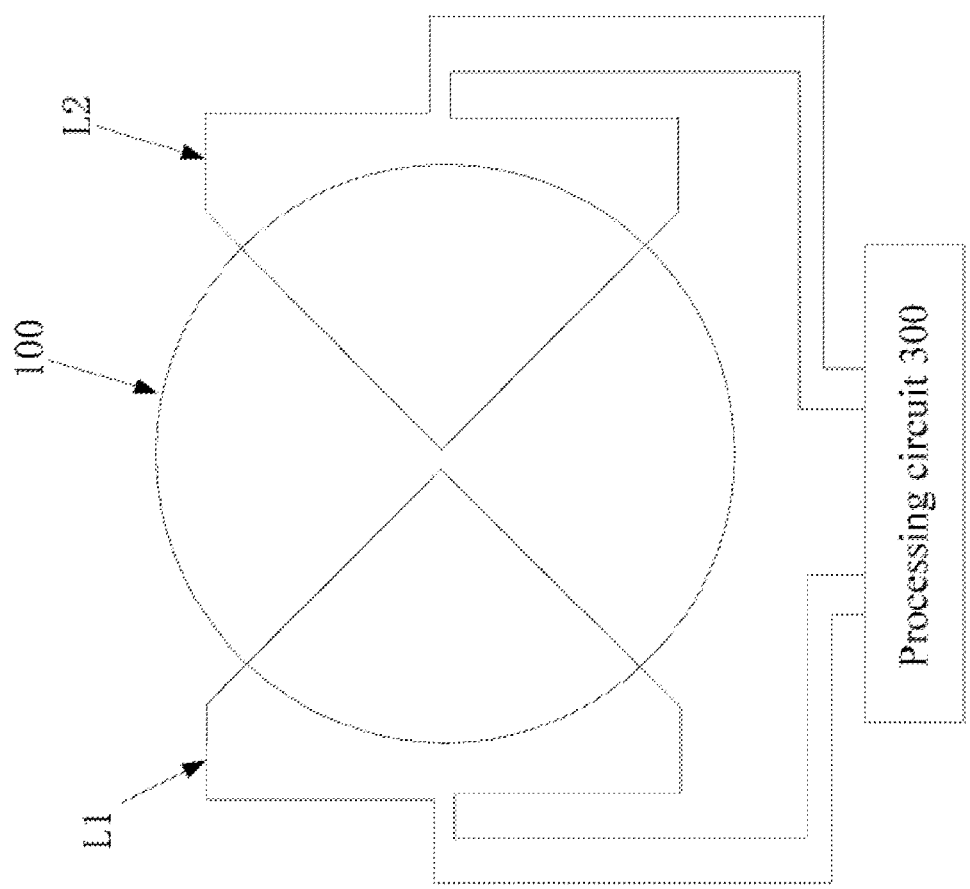
FIG. 2 is a schematic structural diagram of an electronic device in accordance with an embodiment.

An embodiment provides an electronic device, as shown in FIG. 1. The electronic devices includes a receiving antenna 100 for wireless charging, wherein the receiving antenna 100 is configured to receive a radiation signal from a transmitting antenna for wireless charging (not shown in the figure). The electronic devices includes an induction circuit 200, wherein the induction circuit 200 is on a first side of the receiving antenna 100, and as shown in FIG. 2, the induction circuit 200 comprises a first wire L1 and a second wire L2 that are disposed opposite to each other on a first dimension. The electronic device includes, when the transmitting antenna works, the first wire L1 generates a first induced voltage based on a magnetic flux through a first region encircled by the first wire L1, and when the transmitting antenna works, the second wire L2 generates a second induced voltage based on a magnetic flux through a second region encircled by the second wire L2, wherein areas of the first region and the second region are the same. The electronic device includes a processing circuit 300, wherein the processing circuit 300 is electrically connected to the induction circuit 200, and is configured to determine, based on the first induced voltage and the second induced voltage, whether the receiving antenna 100 and the transmitting antenna are aligned on the first dimension.

It should be noted that, when respective loops formed by the two respective wires have an identical effective induction area in a same electromagnetic field, the respective induced voltages generated by the two respective wires in the electromagnetic field are the same, and in this case, the difference between the two induced voltages is close to zero. When respective loops formed by the two respective wires have different effective induction areas in a same electromagnetic field, the respective induced voltages generated by the two respective wires in the electromagnetic field are not equal, and in this case, the difference between the two induced voltages is relatively large, and deviates from zero.

In the electronic device provided by this embodiment, when the transmitting antenna works, the first wire L1 generates the first induced voltage based on the first region encircled by the first wire L1. When the transmitting antenna works, the second wire L2 generates the second induced voltage based on the second region encircled by the second wire L2, wherein the area of the first region is the same as that of the second region. Therefore, when the transmitting antenna works, if the receiving antenna and the transmitting antenna are aligned, the area of the radiation signal generated by the transmitting antenna evenly covers the first region and the second region. In this case, the overlapping area between the area of the radiation signal generated by the transmitting antenna and the first region is the same as the overlapping area between the area of the radiation signal generated by the transmitting antenna and the second region. That is, the effective induction area of the first wire L1 is the same as the effective induction area of the second wire L2, such that the first induced voltage is equal to the second induced voltage.

If the receiving antenna and the transmitting antenna are not aligned, the area of the radiation signal generated by the transmitting antenna is not evenly distributed over the first region and the second region. In this case, the overlapping area between the area of the radiation signal generated by the transmitting antenna and the first region is not the same as the overlapping area between the area of the radiation signal generated by the transmitting antenna and the second region. That is, the effective induction area of the first wire L1 is not the same as the effective induction area of the second wire L2, such that the first induced voltage is not equal to the second induced voltage.

Therefore, the electronic device provided by this embodiment can determine, based on the first induced voltage and the second induced voltage, whether the receiving antenna 100 and the transmitting antenna are aligned on the first dimension. Specifically, when the first induced voltage is equal to the second induced voltage, it is determined that the receiving antenna 100 and the transmitting antenna are aligned on the first dimension. When the first induced voltage is not equal to the second induced voltage, it is determined that the receiving antenna 100 and the transmitting antenna are not aligned on the first dimension.

It should further be noted that, in this embodiment, the central region of the receiving antenna 100 is provided with a through-hole. The projection of the first region and the second region in the direction perpendicular to the plane in which the receiving antenna 100 is located is within the projection of the through-hole so as to ensure that after the receiving antenna 100 and the transmitting antenna are aligned by using the induction circuit 200 and the processing circuit 300, the radiation signal from the transmitting antenna can be received on the first dimension by the receiving antenna 100 to a maximum degree.

Figure 3:
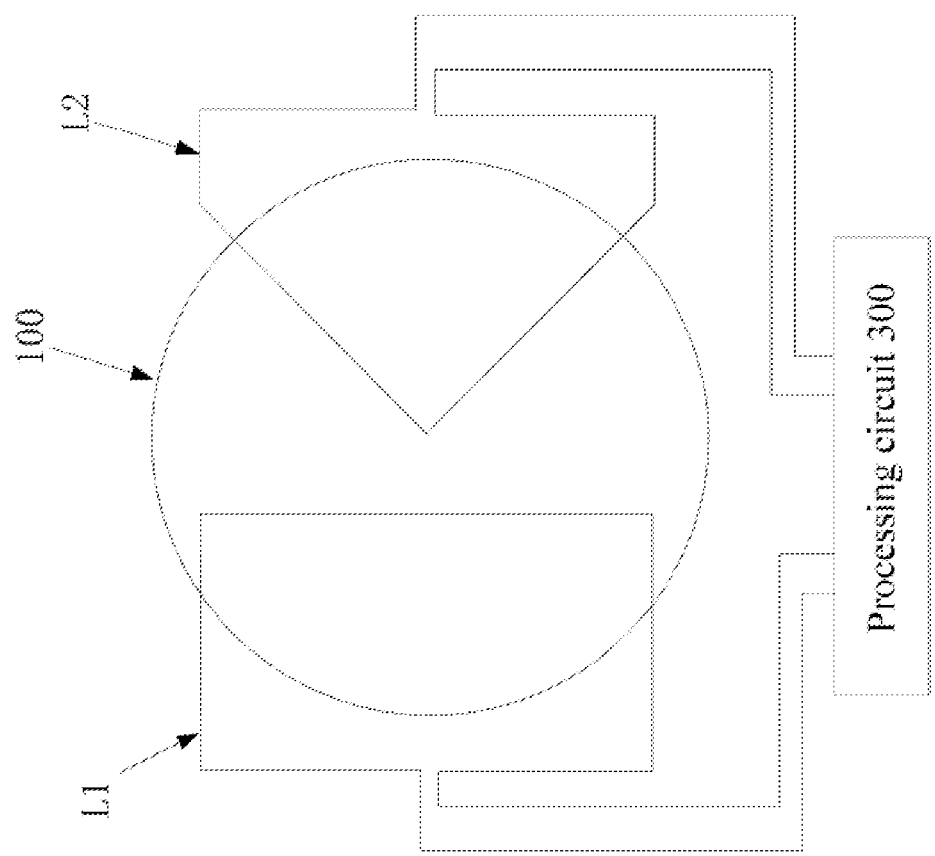
FIG. 3 is a schematic structural diagram of an electronic device in accordance with an embodiment.

Based on the foregoing embodiment, in an embodiment, as shown in FIG. 2, the first wire L1 and the second wire L2 are symmetrically disposed on the first dimension. That is, the first wire L1 and the second wire L2 are symmetric about the center of the central through-hole of the receiving antenna 100. In this embodiment, both the shape and the area of the first region and the second region are exactly the same. The second region exactly overlaps the first region after the second region is rotated 180° about the center of the central through-hole of the receiving antenna 100, improving the precision of adjustment of the induction circuit 200 and the processing circuit 300. However, the embodiments are not limited to this. In other embodiments, the shape of the first region and the second region may also be different, as shown in FIG. 3, as long as it is ensured that the first region and the second region are disposed opposite to each other about the center of the central through-hole of the receiving antenna 100 and the area of the first region is the same as that of the second region.

Based on any one of the foregoing embodiments, in an embodiment, the processing circuit 300 is configured to obtain the first induced voltage and the second induced voltage. The processing circuit 300 is configured to compare the first induced voltage with the second induced voltage. The processing circuit 300 is configured to determine, based on a comparison result of the first induced voltage and the second induced voltage, whether the receiving antenna 100 and the transmitting antenna are aligned on the first dimension.

Figure 4:
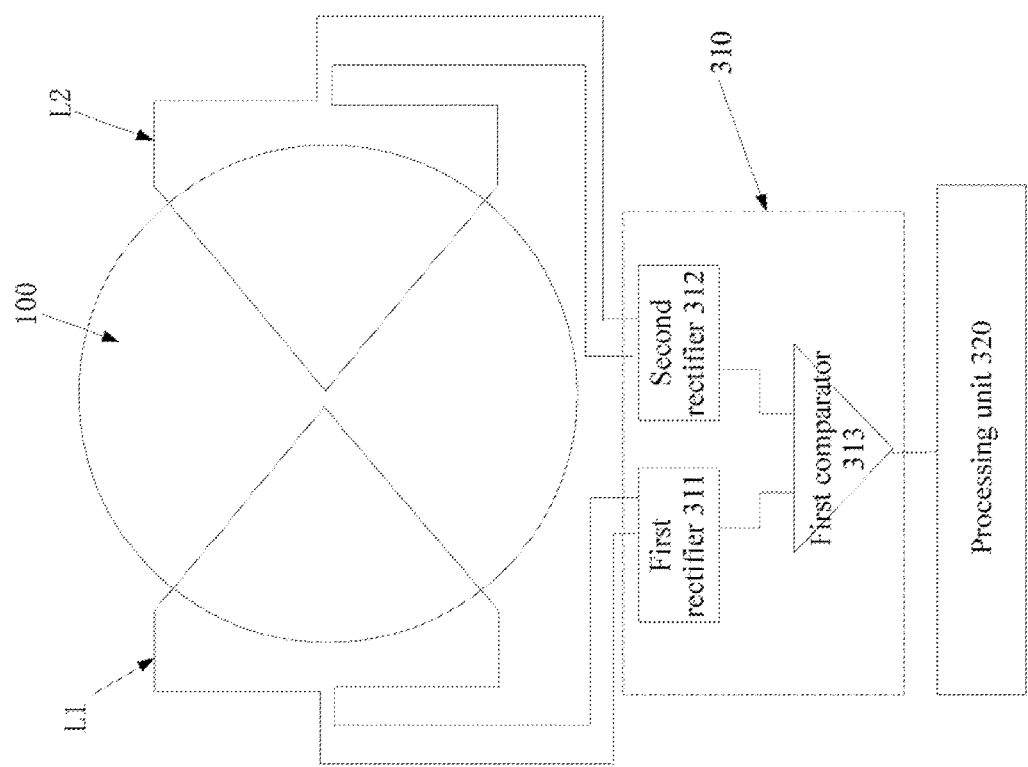
FIG. 4 is a schematic structural diagram of an electronic device in accordance with an embodiment.

Based on the foregoing embodiment, in an embodiment, as shown in FIG. 4, the processing circuit 300 includes a first monitoring unit 310, wherein the first monitoring unit 310 is electrically connected to the induction circuit 200 and is configured to monitor the first induced voltage and the second induced voltage, compare the first induced voltage with the second induced voltage, and output a comparison result of the first induced voltage and the second induced voltage. The processing circuit 300 includes a processing unit 320, wherein the processing unit 320 is electrically connected to the first monitoring unit 310, and is configured to determine, based on the comparison result of the first induced voltage and the second induced voltage, whether the receiving antenna 100 and the transmitting antenna are aligned on the first dimension, and send out a prompt message.

It should be noted that, in an embodiment, the first monitoring unit 310 comprises a comparator configured to compare the first induced voltage with the second induced voltage. Because the input signal of the comparator is a direct current signal, and the induced signal generated by the first wire L1 and the second wire L2 is an alternating current signal, in this embodiment, the first monitoring unit 310 further comprises a rectifier.

Specifically, in an embodiment, the first monitoring unit 310 comprises: a first rectifier 311, a second rectifier 312, and a first comparator 313, wherein one end of the first rectifier 311 is electrically connected to the first wire L1 and the other end of the first rectifier 311 is electrically connected to a first input end of the first comparator 313, such that the first rectifier 311 converts the alternating current signal outputted by the first wire L1 into a direct current signal and outputs the direct current signal to the first comparator 313. One end of the second rectifier 312 is electrically connected to the second wire L2 and the other end of the second rectifier 312 is electrically connected to a second input end of the first comparator 313, such that the second rectifier 312 converts the alternating current signal outputted by the second wire L2 into a direct current signal and outputs the direct current signal to the second output end of the first comparator 313. The first comparator 313 is configured to compare the signals inputted to the first input end with the second input end thereof, and output a comparison result, wherein the comparison result can represent the comparison result of the first induced voltage and the second induced voltage.

After receiving the comparison result outputted by the first monitoring unit 310, the processing unit 320 determines, based on the comparison result, whether the receiving antenna 100 and the transmitting antenna are aligned on the first dimension. Specifically, when the first induced voltage is equal to the second induced voltage, it is determined that the receiving antenna 100 and the transmitting antenna are aligned on the first dimension, and a first prompt message is sent out to hint that the receiving antenna 100 and the transmitting antenna have been aligned on the first dimension. When the first induced voltage is not equal to the second induced voltage, it is determined that the receiving antenna 100 and the transmitting antenna are not aligned on the first dimension, and a second prompt message is sent out to hint that the receiving antenna 100 and the transmitting antenna are not aligned at present.

In another embodiment, the processing circuit 300 is configured to obtain a comparison result of the first induced voltage and the second induced voltage, and determine, based on the comparison result of the first induced voltage and the second induced voltage, whether the receiving antenna 100 and the transmitting antenna are aligned on the first dimension.

Figure 5:
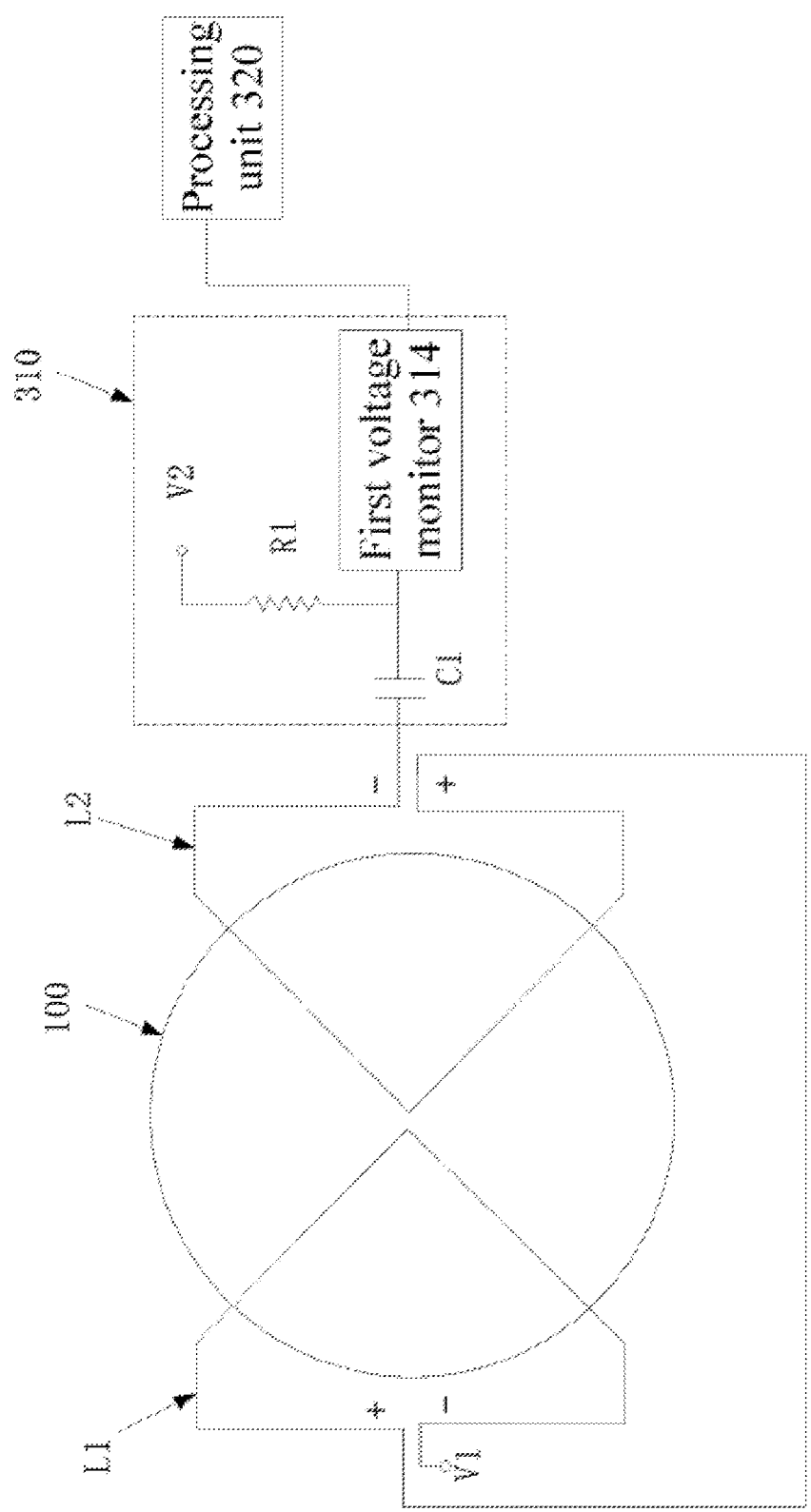
FIG. 5 is a schematic structural diagram of an electronic device in accordance with an embodiment.

Based on the foregoing embodiment, in an embodiment, as shown in FIG. 5, the processing circuit 300 includes a first monitoring unit 310, wherein the first monitoring unit 310 is electrically connected to the induction circuit 200, and is configured to monitor the comparison result of the first induced voltage and the second induced voltage. The processing circuit 300 includes a processing unit 320, wherein the processing unit 320 is electrically connected to the first monitoring unit 310, and is configured to determine, based on the comparison result of the first induced voltage and the second induced voltage, whether the receiving antenna 100 and the transmitting antenna are aligned on the first dimension, and send out a prompt message.

Based on the foregoing embodiment, in an embodiment, still as shown in FIG. 5, a negative electrode of the first wire L1 is electrically connected to a first preset voltage V1, a positive electrode of the first wire L1 is electrically connected to a positive electrode of the second wire L2, and the first monitoring unit 310 comprises: a first voltage monitor 314 electrically connected to a negative electrode of the second wire L2, wherein the first voltage monitor 314 is configured to monitor the voltage of the negative electrode of the second wire L2, and output the voltage of the negative electrode of the second wire L2. The processing unit 320 is configured to determine, based on the first preset voltage V1 and the voltage of the negative electrode of the second wire L2 that is monitored by the first voltage monitor 314, whether the receiving antenna 100 and the transmitting antenna are aligned on the first dimension, and send out a prompt message.

Specifically, when the voltage of the negative electrode of the second wire L2 monitored by the first voltage monitor 314 is equal to the first preset voltage V1, it is determined that the receiving antenna 100 and the transmitting antenna are aligned on the first dimension, and a first prompt message is sent out to hint that the receiving antenna 100 and the transmitting antenna have been aligned on the first dimension. When the voltage of the negative electrode of the second wire L2 monitored by the first voltage monitor 314 is not equal to the first preset voltage V1, it is determined that the receiving antenna 100 and the transmitting antenna are not aligned on the first dimension, and a second prompt message is sent out to hint that the receiving antenna 100 and the transmitting antenna are not aligned on the first dimension at present.

Based on the foregoing embodiment, in a preferred embodiment, a first capacitor C1 is disposed between the first voltage monitor 314 and the negative electrode of the second wire L2, and is configured to filter an interference signal in an output signal from the negative electrode of the second wire L2.

Based on any one of the foregoing embodiments, in an embodiment, the first monitoring unit 310 further comprises: a first resistor R1, wherein one end of the first resistor R1 is electrically connected to a common end of the first capacitor C1 and the first voltage monitor 314, and the other end of the first resistor R1 is electrically connected to a second preset voltage V2. The voltage value of the second preset voltage V2 is a positive value, and the absolute value of the second preset voltage V2 is greater than the absolute value of the first preset voltage V1, such that it is ensured that the voltage at the common end of the first capacitor C1 and the first voltage monitor 314 is a positive value, that is, the input signal to the first voltage monitor 314 is a positive signal. Preferably, in this embodiment, the first voltage monitor 314 is a first analog to digital converter, and is configured to monitor the voltage of the negative electrode of the second wire L2, convert a monitored voltage value into a digital signal, and output the digital signal to the processing unit 320, so that the processing unit 320 determines, based on the first preset voltage V1 and the voltage of the negative electrode of the second wire L2 that is monitored by the first voltage monitor 314, whether the receiving antenna 100 and the transmitting antenna are aligned on the first dimension, and sends out a prompt message.

It should be noted that, based on any one of the foregoing embodiments, in an embodiment, in order to simplify the structure and operation of the processing circuit 300, the voltage value of the first preset voltage V1 is zero, that is, the negative electrode of the first wire L1 is directly grounded. However, the present embodiment is not limited to this, and in other embodiments, the first preset voltage V1 may also be another voltage value, depending on a specific situation.

Figure 6:
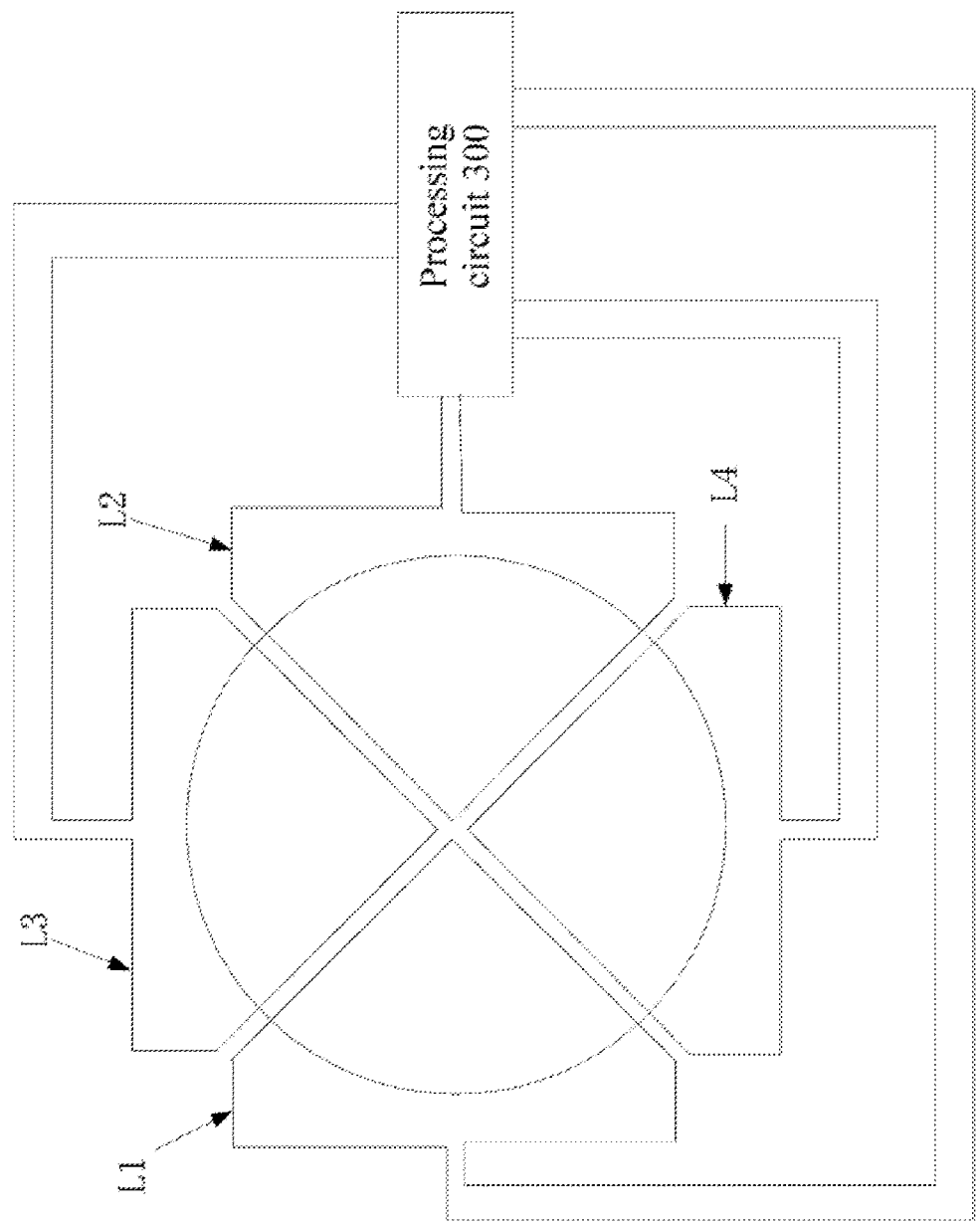
FIG. 6 is a schematic structural diagram of an electronic device in accordance with an embodiment.

Based on any one of the foregoing embodiments, in an embodiment, as shown in FIG. 6, the induction circuit 200 further includes a third wire L3 and a fourth wire L4 disposed opposite to each other on a second dimension. When the transmitting antenna works, the third wire L3 generates a third induced voltage based on a magnetic flux through a third region encircled by the third wire L3, and when the transmitting antenna works, the fourth wire L4 generates a fourth induced voltage based on a magnetic flux through a fourth region encircled by the fourth wire L4, wherein the area of the third region is equal to that of the fourth region.

In this embodiment, the processing circuit 300 is further configured to determine, based on the third induced voltage and the fourth induced voltage, whether the receiving antenna 100 and the transmitting antenna are aligned on the second dimension, so as to further improve the precision of alignment of the receiving antenna 100 and the transmitting antenna. Specifically, when the third induced voltage is equal to the fourth induced voltage, it is determined that the receiving antenna 100 and the transmitting antenna are aligned on the second dimension. When the third induced voltage is not equal to the fourth induced voltage, it is determined that the receiving antenna 100 and the transmitting antenna are not aligned on the second dimension.

It should be noted that, in this embodiment, the projection of the third region and the fourth region in the direction perpendicular to the plane in which the receiving antenna 100 is located is within the projection of the central through-hole of the receiving antenna 100. This ensures that after the receiving antenna 100 and the transmitting antenna are aligned by using the induction circuit 200 and the processing circuit 300, the radiation signal from the transmitting antenna can be received on the second dimension by the receiving antenna 100 to a maximum degree.

Based on the foregoing embodiment, in an embodiment, the third wire L3 and the fourth wire L4 are symmetrically disposed on the second dimension. That is, the third wire L3 and the fourth wire L4 are symmetric about the center of the central through-hole of the receiving antenna 100. In this embodiment, both the shape and the area of the third region and the fourth region are exactly the same, and the fourth region exactly overlaps the third region after the fourth region is rotated 180° about the center of the central through-hole of the receiving antenna 100, improving the precision of adjustment of the induction circuit 200 and the processing circuit 300. However, the embodiments of the present application are not limited to this. In other embodiments, the shape of the third region and the fourth region may also be different, as long as it is ensured that the third region and the fourth region are disposed opposite to each other about the center of the central through-hole of the receiving antenna 100, and the area of the third region is the same as that of the fourth region.

Based on the foregoing embodiment, in an embodiment, the processing circuit 300 is configured to obtain the third induced voltage and the fourth induced voltage, compare the third induced voltage with the fourth induced voltage, and determine, based on a comparison result of the third induced voltage and the fourth induced voltage, whether the receiving antenna 100 and the transmitting antenna are aligned on the second dimension.

Figure 7:
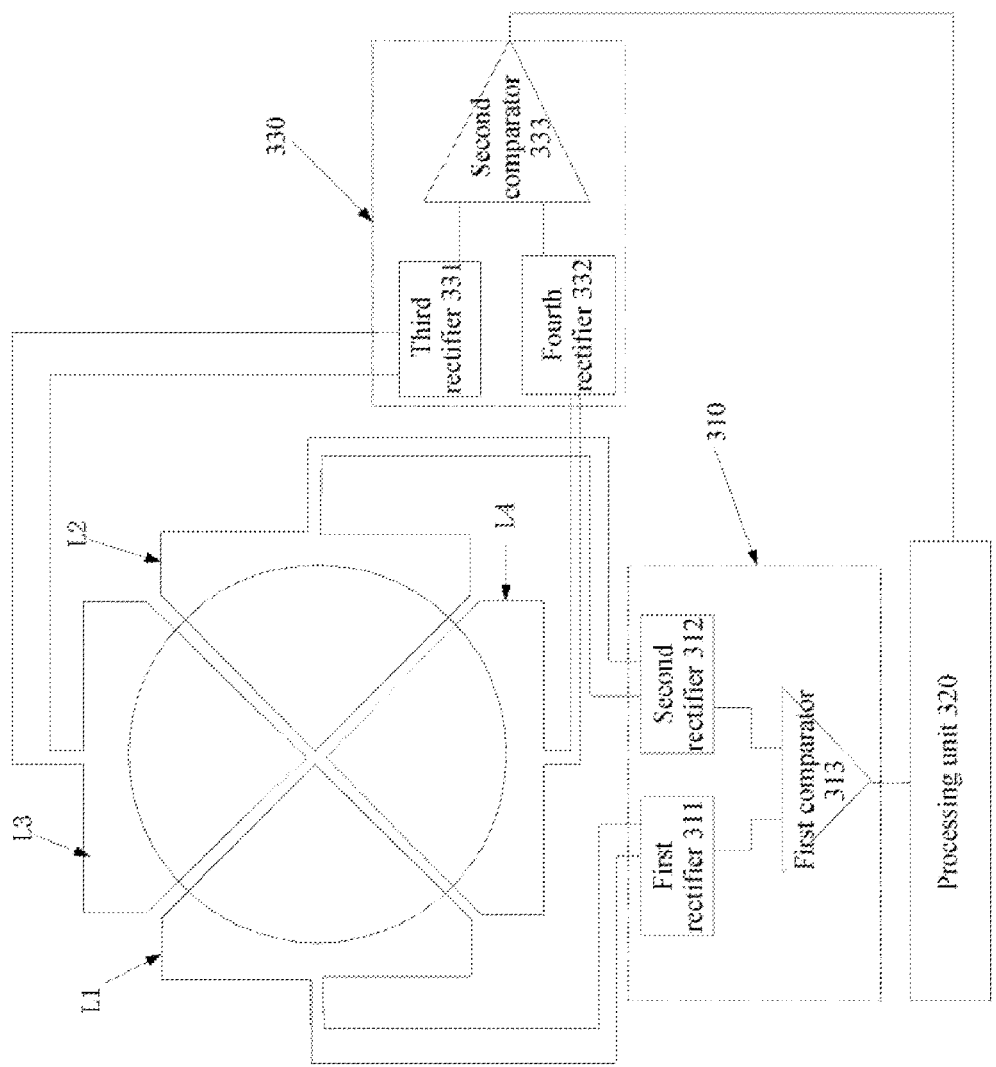
FIG. 7 is a schematic structural diagram of an electronic device in accordance with an embodiment.

Specifically, based on the foregoing embodiment, in an embodiment, as shown in FIG. 7, the processing circuit 300 includes a second monitoring unit 330, wherein the second monitoring unit 330 is electrically connected to the induction circuit 200. The second monitoring unit 330 is configured to monitor the third induced voltage and the fourth induced voltage, compare the third induced voltage with the fourth induced voltage, and output a comparison result of the third induced voltage and the fourth induced voltage. The processing unit 320 is electrically connected to the second monitoring unit 330, and is configured to determine, based on the comparison result of the third induced voltage and the fourth induced voltage, whether the receiving antenna 100 and the transmitting antenna are aligned on the second dimension, and send out a prompt message.

Preferably, the second monitoring unit 330 comprises: a third rectifier 331, a fourth rectifier 332, and a second comparator 333, wherein one end of the third rectifier 331 is electrically connected to the third wire L3 and the other end of the third rectifier 311 is electrically connected to a first input end of the second comparator 333, such that the third rectifier 331 converts the alternating current signal outputted by the third wire L3 into a direct current signal and outputs the direct current signal to the second comparator 333. One end of the fourth rectifier 332 is electrically connected to the fourth wire L4 and the other end of the fourth rectifier 312 is electrically connected to a second input end of the second comparator 333, such that the fourth rectifier 332 converts the alternating current signal outputted by the fourth wire L4 into a direct current signal and outputs the direct current signal to the second comparator 333. The second comparator 333 is configured to compare the signals inputted to the first input end with the second input end thereof, and output a comparison result to the processing unit 320, wherein the comparison result can represent the comparison result of the third induced voltage and the fourth induced voltage.

In another embodiment, the processing circuit 300 is configured to obtain a comparison result of the third induced voltage and the fourth induced voltage, and determine, based on the comparison result thereof, whether the receiving antenna 100 and the transmitting antenna are aligned on the second dimension.

Figure 8:
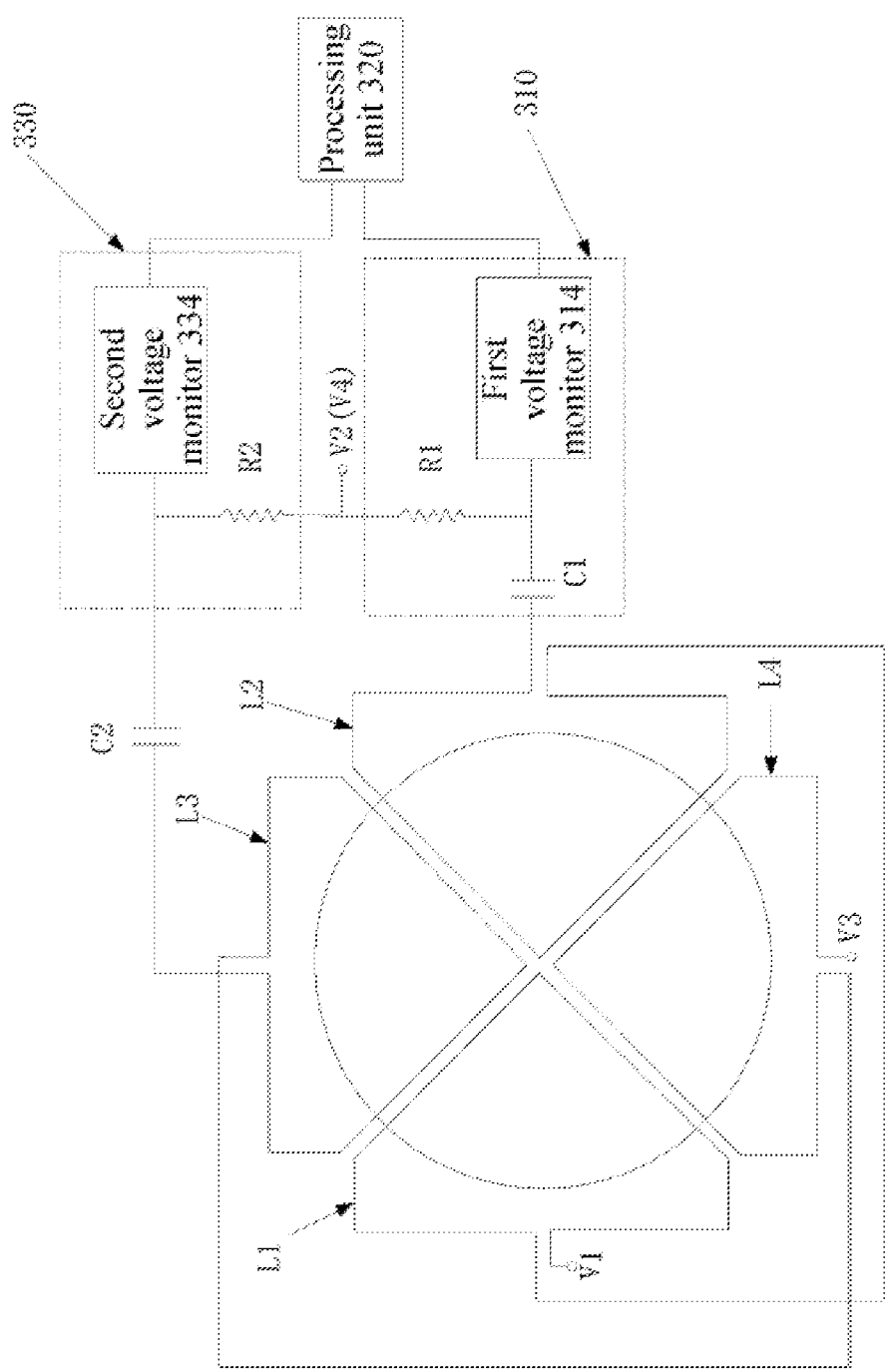
FIG. 8 is a schematic structural diagram of an electronic device in accordance with an embodiment.

Based on the foregoing embodiment, in an embodiment, as shown in FIG. 8, the processing circuit 300 comprises a second monitoring unit 330, wherein the second monitoring unit 330 is electrically connected to the induction circuit 200 and is configured to monitor the comparison result of the third induced voltage and the fourth induced voltage. The processing unit 320 is electrically connected to the second monitoring unit 330 and is configured to determine, based on the comparison result thereof, whether the receiving antenna 100 and the transmitting antenna are aligned on the second dimension, and send out a prompt message.

Based on the foregoing embodiment, in an embodiment, still as shown in FIG. 8, a negative electrode of the third wire L3 is electrically connected to a third preset voltage V3 and a positive electrode of the third wire L3 is electrically connected to a positive electrode of the fourth wire L4. The second monitoring unit 330 includes a second voltage monitor 334 electrically connected to a negative electrode of the fourth wire L4, wherein the second voltage monitor 334 is configured to monitor the voltage of the negative electrode of the fourth wire L4, and output the voltage of the negative electrode of the fourth wire L4. The processing unit 320 is configured to determine, based on the third preset voltage V3 and the voltage of the negative electrode of the fourth wire L4 that is monitored by the second voltage monitor, whether the receiving antenna 100 and the transmitting antenna are aligned on the second dimension, and send out a prompt message.

Specifically, when the voltage of the negative electrode of the fourth wire L4 monitored by the second voltage monitor 334 is equal to the third preset voltage V3, it is determined that the receiving antenna 100 and the transmitting antenna are aligned on the second dimension, and a third prompt message is sent out to prompt that the receiving antenna 100 and the transmitting antenna have been aligned on the second dimension. When the voltage of the negative electrode of the fourth wire L4 monitored by the second voltage monitor 334 is not equal to the third preset voltage V3, it is determined that the receiving antenna 100 and the transmitting antenna are not aligned on the second dimension, and a fourth prompt message is sent out to prompt that the receiving antenna 100 and the transmitting antenna are not aligned on the second dimension at present.

Based on the foregoing embodiment, in a preferred embodiment, a second capacitor C2 is disposed between the second voltage monitor 334 and the negative electrode of the fourth wire L4, and is configured to filter an interference signal in a signal outputted from the negative electrode of the fourth wire L4.

Based on the foregoing embodiment, in an embodiment, the second voltage monitoring unit 334 further includes: a second resistor R2, wherein one end of the second resistor R2 is electrically connected to a common end of the second capacitor C2 and the second voltage monitor 334 and the other end of the second resistor R2 is electrically connected to a fourth preset voltage V4. The voltage value of the fourth preset voltage V4 is a positive value and the absolute value of the fourth preset voltage V4 is greater than the absolute value of the third preset voltage V3, such that it is ensured that the voltage at the common end of the second capacitor C2 and the second voltage monitor 334 is a positive value, that is, the input signal to the second voltage monitor 334 is a positive signal.

Preferably, in this embodiment, the second voltage monitor 334 is a second analog to digital converter and is configured to: monitor the voltage of the negative electrode of the fourth wire L4; convert a monitored voltage value into a digital signal; and output the digital signal to the processing unit 320. This is done so that the processing unit 320 determines, based on the third preset voltage V3 and the voltage of the negative electrode of the fourth wire L4 that is monitored by the second voltage monitor, whether the receiving antenna 100 and the transmitting antenna are aligned on the second dimension, and sends out a prompt message.

It should be noted that, in this embodiment, in order to simplify the structure and operation of the processing circuit 300, the voltage value of the third preset voltage V3 is zero, that is, the negative electrode of the third wire L3 is directly grounded. However, the embodiments of the present application are not limited to this, and in other embodiments, the third preset voltage V3 may also be another voltage value depending on a specific situation.

It should further be noted that, in order to further simplify the structure and operation of the processing circuit 300, the second preset voltage V2 is equal to the fourth preset voltage V4. However, the embodiments of the present application are not limited to this, and in other embodiments, the second preset voltage V2 and the fourth preset voltage V4 may be not equal, depending on a specific situation.

Based on any one of the foregoing embodiments, in a preferred embodiment, the processing unit 320 is a processor. However, the embodiments of the present application are not limited to this, depending on a specific situation.

In summary of the above, in the electronic device provided by the embodiments, the induction circuit 200 and the processing circuit 300 are used to adjust the effect of alignment between the receiving antenna 100 and the transmitting antenna to ensure that the receiving antenna 100 and the transmitting antenna are aligned on the first dimension, so as to improve the charging efficiency of the electronic device. Moreover, in the electronic device provided by the embodiments, the induction circuit 200 consists of wires only, and is small in size and light in weight, adapting to the trend of lightening and thinning of electronic devices, and improving the practicability of the electronic devices.

In addition, an embodiment further provides an alignment detection apparatus, wherein the alignment detection apparatus includes an induction circuit, located between a receiving antenna for wireless charging and a transmitting antenna for wireless charging, wherein the induction circuit comprises a first wire and a second wire. The first wire and the second wire are disposed opposite to each other on a first dimension. The first wire generates a first induced voltage based on a magnetic flux through a first region encircled by the first wire. The second wire generates a second induced voltage based on a magnetic flux through a second region encircled by the second wire, wherein areas of the first region and the second region are the same.

The alignment detection apparatus includes a voltage monitoring circuit, electrically connected to the induction circuit, and is configured to obtain preset parameters of the first induced voltage and the second induced voltage, wherein the preset parameters of the first induced voltage and the second induced voltage are used to determine whether the receiving antenna and the transmitting antenna are aligned on the first dimension.

It should be noted that, when respective loops formed by the two respective wires have an identical effective induction area in a same electromagnetic field, the respective induced voltages generated by the two respective wires in the electromagnetic field are the same, and in this case, the difference between the two induced voltages is close to zero. When respective loops formed by the two respective wires have different effective induction areas in a same electromagnetic field, the respective induced voltages generated by the two respective wires in the electromagnetic field are not equal, and in this case, the difference between the two induced voltages is relatively large, and deviates from zero.

In the alignment detection apparatus provided by this embodiment, when the transmitting antenna works, the first wire generates the first induced voltage based on the first region encircled by the first wire. When the transmitting antenna works, the second wire generates the second induced voltage based on the second region encircled by the second wire, wherein the area of the first region is the same as that of the second region. Therefore, when the transmitting antenna works, if the receiving antenna and the transmitting antenna are aligned, the area of the radiation signal generated by the transmitting antenna evenly covers the first region and the second region. In this case, the overlapping area between the area of the radiation signal generated by the transmitting antenna and the first region is the same as the overlapping area between the area of the radiation signal generated by the transmitting antenna and the second region. That is, the effective induction area of the first wire is the same as the effective induction area of the second wire, such that the first induced voltage is equal to the second induced voltage.

If the receiving antenna and the transmitting antenna are not aligned, the area of the radiation signal generated by the transmitting antenna is not evenly distributed over the first region and the second region. In this case, the overlapping area between the area of the radiation signal generated by the transmitting antenna and the first region is not the same as the overlapping area between the area of the radiation signal generated by the transmitting antenna and the second region.

That is, the effective induction area of the first wire is not the same as the effective induction area of the second wire, such that the first induced voltage is not equal to the second induced voltage.

Therefore, the alignment detection apparatus provided by this embodiment can obtain preset parameters of the first induced voltage and the second induced voltage and determine, by using the preset parameters of the first induced voltage and the second induced voltage, whether the receiving antenna and the transmitting antenna are aligned on the first dimension. Specifically, when the first induced voltage is equal to the second induced voltage, it is determined that the receiving antenna and the transmitting antenna are aligned on the first dimension. When the first induced voltage is not equal to the second induced voltage, it is determined that the receiving antenna and the transmitting antenna are not aligned on the first dimension.

It should be further noted that, in this embodiment, the alignment detection apparatus may be disposed on the side where the receiving antenna is located, or may also be disposed on the side where the transmitting antenna is located. However, the embodiments of the present application are not limited to this, depending on a specific situation.

Based on the foregoing embodiment, in an embodiment, the voltage monitoring circuit is configured to obtain a voltage value of the first induced voltage and a voltage value of the second induced voltage, and output the voltage value of the first induced voltage and the voltage value of the second induced voltage. When the voltage value of the first induced voltage is equal to the voltage value of the second induced voltage, it is determined that the receiving antenna and the transmitting antenna are aligned on the first dimension. When the voltage value of the first induced voltage is not equal to the voltage value of the second induced voltage, it is determined that the receiving antenna and the transmitting antenna are not aligned on the first dimension.

In another embodiment, the voltage monitoring circuit is configured to obtain a comparison result of the first induced voltage and the second induced voltage. When the comparison result is zero, it is determined that the receiving antenna and the transmitting antenna are aligned on the first dimension. When the comparison result is not zero, it is determined that the receiving antenna and the transmitting antenna are not aligned on the first dimension.

Based on any one of the foregoing embodiments, in an embodiment, the induction circuit further includes a third wire and a fourth wire disposed opposite to each other on a second dimension. When the transmitting antenna works, the third wire generates a third induced voltage based on a magnetic flux through a third region encircled by the third wire, and when the transmitting antenna works, the fourth wire generates a fourth induced voltage based on a magnetic flux through a fourth region encircled by the fourth wire, wherein areas of the third region and the fourth region are the same. In the induction circuit, the voltage monitoring circuit is further configured to obtain preset parameters of the third induced voltage and the fourth induced voltage, wherein the preset parameters of the third induced voltage and the fourth induced voltage are used to determine whether the receiving antenna and the transmitting antenna are aligned on the second dimension.

Based on the foregoing embodiment, in an embodiment, the voltage monitoring circuit is configured to obtain a voltage value of the third induced voltage and a voltage value of the fourth induced voltage, and output the voltage value of the third induced voltage and the voltage value of the fourth induced voltage. When the voltage value of the third induced voltage is equal to the voltage value of the fourth induced voltage, it is determined that the receiving antenna and the transmitting antenna are aligned on the second dimension. When the voltage value of the third induced voltage is not equal to the voltage value of the fourth induced voltage, it is determined that the receiving antenna and the transmitting antenna are not aligned on the second dimension.

In another embodiment, the voltage monitoring circuit is configured to obtain a comparison result of the third induced voltage and the fourth induced voltage and output the comparison result thereof. When the comparison result thereof is zero, it is determined that the receiving antenna and the transmitting antenna are aligned on the second dimension. When the comparison result thereof is not zero, it is determined that the receiving antenna and the transmitting antenna are not aligned on the second dimension.

Because both the function and the structure of the induction circuit in the alignment detection apparatus provided by the embodiments are the same as those of the induction circuit in the electronic device provided by the embodiments, and the function and the structure of the voltage monitoring circuit in the alignment detection apparatus are also similar to those of the first monitoring unit and/or the second monitoring unit in the electronic device, detailed description is not provided again herein. For details, refer to the description regarding the induction circuit, the first monitoring unit, and the second monitoring unit in the electronic device.

It is obvious from the above that, in the alignment detection apparatus provided by the embodiments, a circuit structure is used to adjust the effect of alignment between the receiving antenna and the transmitting antenna to ensure that the receiving antenna and the transmitting antenna are aligned on the first dimension and/or the second dimension, so as to improve the charging efficiency of an electronic device that uses the alignment detection apparatus. Moreover, in the alignment detection apparatus provided by the embodiments, the induction circuit consists of wires only, and is small in size and light in weight, adapting to the trend of lightening and thinning of electronic devices, and improves the charging efficiency of the electronic devices that use the alignment detection apparatus.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. An electronic device, comprising:
   a processor;
   a power supply module operatively coupled to the processor;

a receiving antenna operatively coupled to the power supply module, wherein the receiving antenna cooperates with a transmitting antenna of a wireless charger to charge the power supply module wirelessly;

an inductor arranged with respect to the receiving antenna, wherein the inductor comprises a first wire and a second wire, disposed opposite to each other, through which a first induced voltage and a second induced voltage are generated respectively, wherein the first wire is different from and unconnected to the second wire;

a comparator for comparing the first and second induced voltages;

a memory operatively coupled to the processor and that stores instructions executable by the processor to determine whether the receiving antenna is aligned with respect to the transmitting antenna of the wireless charger based upon the comparison of the first and second induced voltages;

wherein the first wire encircles a first region and the second wire encircles a second region, the first region and the second region having the same area irrespective of whether the first region and the second region are a matching shape;

wherein the electronic device is a handheld electronic device.

2. The electronic device of claim 1, wherein the instructions are further executable by the processor to send a command for a prompt message to be sent out responsive to determining that the receiving antenna is not aligned with respect to the transmitting antenna of the wireless charger.

3. The electronic device of claim 1, wherein the first wire and the second wire are disposed symmetrically on the first dimension.

4. The electronic of claim 3, wherein when the first induced voltage is equal to the second induced voltage, it is determined that the receiving antenna and the transmitting antenna are aligned on the first dimension; and when the first induced voltage is not equal to the second induced voltage, it is determined that the receiving antenna and the transmitting antenna are not aligned on the first dimension.

5. The electronic device of claim 4, further comprising a processing circuit, wherein the processing circuit:

obtains the first induced voltage and the second induced voltage;

compares the first induced voltage with the second induced voltage; and determines, based on a comparison result of the first induced voltage and the second induced voltage, whether the receiving antenna and the transmitting antenna are aligned on the first dimension.

6. The electronic device of claim 5, wherein the processing circuit comprises:

a first monitoring unit, wherein the first monitoring unit is operatively connected to the induction circuit, and is configured to:

monitor the first induced voltage and the second induced voltage;

compare the first induced voltage with the second induced voltage; and output a comparison result of the first induced voltage and the second induced voltage; and a processing unit, wherein the processing unit is electrically connected to the first monitoring unit, and is configured to determine, based on the comparison result of the first induced voltage and the second induced voltage, whether the receiving antenna and the transmitting antenna are aligned on the first dimension, and send out a prompt message.

7. The electronic device of claim 6, wherein the processing circuit:

acquires a comparison result of the first induced voltage and the second induced voltage, and determines, based on the comparison result of the first induced voltage and the second induced voltage, whether the receiving antenna and the transmitting antenna are aligned on the first dimension.

8. The electronic device of claim 7, wherein the processing circuit comprises:

a first monitoring unit, wherein the first monitoring unit is electrically connected to the induction circuit and is configured to monitor the comparison result of the first induced voltage and the second induced voltage; and a processing unit, wherein the processing unit is electrically connected to the first monitoring unit, and is configured to determine, based on the comparison result of the first induced voltage and the second induced voltage, whether the receiving antenna and the transmitting antenna are aligned on the first dimension, and send out a prompt message.

9. The electronic device of claim 8, wherein a negative electrode of the first wire is electrically connected to a first preset voltage, a positive electrode of the first wire is electrically connected to a positive electrode of the second wire, and the first monitoring unit comprises:

a first voltage monitor electrically connected to a negative electrode of the second wire, wherein the first voltage monitor is configured to monitor a voltage of the negative electrode of the second wire, and output the voltage of the negative electrode of the second wire; and the processing unit is configured to determine, based on the first preset voltage and the voltage of the negative electrode of the second wire monitored by the first voltage monitor, whether the receiving antenna and the transmitting antenna are aligned on the first dimension, and send out a prompt message.

10. The electronic device of claim 9, wherein a first capacitor is disposed between the first voltage monitor and the negative electrode of the second wire and is configured to filter an interference signal in an output signal from the negative electrode of the second wire.

11. The electronic device of claim 10, wherein the first monitoring unit further comprises:

a first resistor, wherein one end of the first resistor is electrically connected to a common end of the first capacitor and the first voltage monitor and the other end of the first resistor is electrically connected to a second preset voltage; and wherein the voltage value of the second preset voltage is a positive value, and the absolute value of the second preset voltage is greater than the absolute value of the first preset voltage.

12. The electronic device of claim 11, wherein the first voltage monitor is a first analog to digital converter, and:

monitors the voltage of the negative electrode of the second wire, converts a monitored voltage value into a digital signal, and outputs the digital signal.

13. The electronic device of claim 11, wherein the induction circuit further comprises:

a third wire and a fourth wire disposed opposite to each other on a second dimension, wherein when the transmitting antenna works, the third wire generates a third induced voltage based on a magnetic flux through a third region encircled by the third wire, and when the transmitting antenna works, the fourth wire generates a fourth induced voltage based on a magnetic flux through a fourth region encircled by the fourth wire, wherein areas of the third region and the fourth region are the same; and the processing circuit is further configured to determine, based on the third induced voltage and the fourth induced voltage, whether the receiving antenna and the transmitting antenna are aligned on the second dimension.

14. The electronic device of claim 13, wherein the third wire and the fourth wire are disposed symmetrically on the second dimension.

15. The electronic device of claim 14, wherein when the third induced voltage is equal to the fourth induced voltage, it is determined that the receiving antenna and the transmitting antenna are aligned on the second dimension; and when the third induced voltage is not equal to the fourth induced voltage, it is determined that the receiving antenna and the transmitting antenna are not aligned on the second dimension.

16. The electronic device of claim 15, wherein the processing circuit:

obtains the third induced voltage and the fourth induced voltage, compares the third induced voltage with the fourth induced voltage, and determines, based on a comparison result of the third induced voltage and the fourth induced voltage, whether the receiving antenna and the transmitting antenna are aligned on the second dimension.

17. The electronic device of claim 15, wherein the processing circuit acquires a comparison result of the third induced voltage and the fourth induced voltage, and determine, based on the comparison result of the third induced voltage and the fourth induced voltage, whether the receiving antenna and the transmitting antenna are aligned on the second dimension.

18. The electronic device of claim 17, wherein the processing circuit comprises:

a second monitoring unit, wherein the second monitoring unit is electrically connected to the induction circuit, and is configured to monitor the comparison result of the third induced voltage and the fourth induced voltage; and the processing unit is electrically connected to the second monitoring unit, and is configured to determine, based on the comparison result of the third induced voltage and the fourth induced voltage, whether the receiving antenna and the transmitting antenna are aligned on the second dimension, and send out a prompt message.

19. The electronic device of claim 18, wherein a negative electrode of the third wire is electrically connected to a third preset voltage, a positive electrode of the third wire is electrically connected to a positive electrode of the fourth wire, and the second monitoring unit comprises:

a second voltage monitor electrically connected to a negative electrode of the fourth wire, wherein the second voltage monitor is configured to monitor a voltage of the negative electrode of the fourth wire, and output the voltage of the negative electrode of the fourth wire; and the processing unit is configured to determine, based on the third preset voltage and the voltage of the negative electrode of the fourth wire monitored by the second voltage monitor, whether the receiving antenna and the transmitting antenna are aligned on the second dimension, and send out a prompt message.

20. The electronic device of claim 19, wherein a second capacitor is disposed between the second voltage monitor and the negative electrode of the fourth wire, and is configured to filter an interference signal in an output signal from the negative electrode of the second wire;

wherein the second monitoring unit further comprises: a second resistor, wherein one end of the second resistor is electrically connected to a common end of the second capacitor and the second voltage monitor, and the other end of the second resistor is electrically connected to a fourth preset voltage; the voltage value of the fourth preset voltage is a positive value, and the absolute value of the fourth preset voltage is greater than the absolute value of the second preset voltage; and wherein the second voltage monitor is a second analog to digital converter, and is configured to monitor the voltage of the negative electrode of the fourth wire and to convert a monitored voltage value into a digital signal, and output the digital signal.

* * * * *